United States Patent [19]

Yokota et al.

[11] 3,928,544
[45] Dec. 23, 1975

[54] PROCESS FOR PRODUCING CARBON PRODUCTS

[75] Inventors: Hisao Yokota, Kobe; Akira Kobayashi, Nishinomiya; Jiro Horikawa, Suita; Akira Miyashita, Ibaraki, all of Japan

[73] Assignee: Sumitomo Chemical Company, Limited, Osaka, Japan

[22] Filed: Mar. 5, 1973

[21] Appl. No.: 337,856

[30] Foreign Application Priority Data
Mar. 6, 1972 Japan.............................. 47-23020

[52] U.S. Cl. .................. 423/447; 423/449; 264/29
[51] Int. Cl.² .................. C01B 31/02; C01B 31/07
[58] Field of Search .......... 423/447, 448, 449, 445; 264/29; 260/93.5 A, 93.5 C, 93.5 R

[56] References Cited
UNITED STATES PATENTS

| | | | |
|---|---|---|---|
| 2,697,028 | 12/1954 | Baker et al. ......................... | 423/449 |
| 2,987,508 | 6/1961 | Ruffing et al. ................. | 260/93.5 A |
| 3,019,077 | 1/1962 | Carey et al. .................... | 260/93.5 A |
| 3,427,120 | 2/1969 | Shindo et al. ................... | 423/447 X |
| 3,529,934 | 9/1970 | Shindo .............................. | 423/447 |
| 3,595,946 | 7/1971 | Joo et al. .............................. | 264/29 |
| 3,666,417 | 5/1972 | Araki et al. ......................... | 423/447 |
| 3,822,244 | 7/1974 | Peyrot .............................. | 260/93.5 A |

OTHER PUBLICATIONS
Boundy et al. "Styrene Its Polymers, Copolymers and Derivatives" copyright 1952, pages 678–680, 719–726, 878 and 879.

Primary Examiner—Edward J. Meros
Attorney, Agent, or Firm—Stewart and Kolasch, Ltd.

[57] ABSTRACT

Novel process for producing carbon products, i.e. carbon fiber or filmy carbon, by forming a polymer comprising long sequences of the unit of the general formula (I):

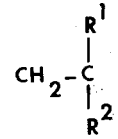

wherein $R_1$ is an aromatic hydrocarbon or heterocyclic aryl group, $R_2$ is hydrogen, alkyl, an aromatic hydrocarbon or a heterocyclic aryl group, and $R_1$ and $R_2$ may be the same or different, or polyindene or polyacenaphthylene into a fiber or film, subjecting the product to a chemical treatment selected from sulfonation, chlorosulfonation, nitration and bromination, and carbonizing the resultant product by heating to give a carbon fiber or filmy carbon, which has excellent mechanical strength and is homogeneous.

10 Claims, No Drawings

PROCESS FOR PRODUCING CARBON PRODUCTS

The present invention relates to a novel process for producing carbon products, i.e. carbon fiber or filmy carbon. More particularly, it relates to a process for producing carbon fiber or filmy carbon by forming a polymer comprising long sequences of the unit of the general formula (I):

wherein $R_1$ is an aromatic hydrocarbon or heterocyclic aryl group, $R_2$ is hydrogen, alkyl, an aromatic hydrocarbon or a heterocyclic aryl group, and $R_1$ and $R_2$ may be the same or different, or polyindene or polyacenaphthylene to give a fiber or film, subjecting the product to a chemical treatment selected from sulfonation, chlorosulfonation, nitration and bromination, and carbonizing the resultant product by heating to give the carbon fiber or filmy carbon.

When the polymer comprising long sequences of the unit of formula (I) is heated as it is, as for instance, in case of polystyrene, it is decomposed into volatile components having low molecular weight without production of carbon, or as for instance, in case of polyvinylpyridine, the polymer may be partially carbonized, but the yield of carbon is merely less than 10%. Furthermore, when the polymer comprising long sequences of the unit of formula (I), polyindene or polyacenaphthylene is heated, it can not maintain its original shape, since it is melted before being carbonized.

Because of these reasons, polymers comprising long sequences of the unit of formula (I), polyindene and polyacenaphthylene have, hitherto, never been used as a starting material for the production of carbon fiber or filmy carbon.

Under the circumstances, studies have been made to find a novel process for carbonizing such polymers and further, the reactivity of the aromatic hydrocarbon or heterocyclic aryl group contained in the side chain of the polymers has been studied. As the results, it has now been surprisingly discovered that when the fiber or film of the polymers is subjected to a chemical treatment selected from sulfonation, chlorosulfonation, nitration and bromination and thereafter subjected to burning, the desired carbon fiber or filmy carbon can be obtained in high carbonization yield without melting, i.e. as it is maintained in the original shape.

An object of the present invention is to provide a novel process for producing carbon fiber or filmy carbon from a polymer comprising long sequences of the unit of formula (I), polyindene or polyacenaphthylene.

Another object of the invention is to provide a process for carbonizing the polymers in high carbonization yield without melting.

These and other objects will be apparent from the description hereinafter.

According to the present invention, the polymer comprising long sequences of the unit of formula (I), polyindene or polyacenaphthylene can be readily carbonized to give the desired carbon fiber or filmy carbon by forming the polymer into a fiber or film, subjecting the product to a chemical treatment selected from sulfonation, chlorosulfonation, nitration and bromination and then carbonizing the resultant product by heating.

As the aromatic hydrocarbon group defined for $R_1$ in the above formula (I), there may be either a monocyclic group (e.g. phenyl) or a polycyclic group (e.g. naphthyl, anthryl, or pyrenyl). As the heterocyclic aryl group, there may be a nitrogen-containing heterocyclic aryl group (e.g. pyridyl, pyrazinyl, pyrimidyl, pyridazinyl, indolyl, or carbazolyl) or a sulfur- or oxygen-containing heterocyclic aryl group (e.g. benzothienyl or pyranyl). The suitable examples of the polymer comprising long sequences of the unit of formula (I) may be polystyrene, polychlorostyrene, polydimethylstyrene, polychloromethylstyrene, polyvinylnaphthalene, polyvinylanthracene, polyvinylpyridine, poly-N-vinylcarbazole, or the like, and these polymers can be readily obtained by polymerizing each corresponding monomer.

For forming the polymers into fiber, there may be used a conventional method, such as melt spinning, wet spinning and dry spinning. And for forming the polymers into film, they are dissolved in a suitable solvent (e.g toluene, benzene or chloroform) and then the solution is evaporated to give a film, or they are formed by melt pressing or inflation.

The starting polymers used in the present invention can be easily melt or dissolved in a solvent and therefore can be easily formed into a fiber or film. The fiber may be a long or short monofilament having a diameter of 1 to 500 $\mu$, preferably 1 to 100 $\mu$, or a sliver or tow consisting of 2 to 300 fibers. The film may be 5 to 1000 $\mu$, preferably 10 to 500 $\mu$, in thickness.

The sulfonation in the present process can be carried out, for instance, by exposing the fiber or film of the polymers in a vapor of sulfuric anhydride at 0° to 300°C, preferably at room temperature to 150°C, or by dipping them into fuming sulfuric acid at 0° to 200°C, preferably at room temperature to 60°C in the presence of a catalyst such as mercury sulfate. The chlorosulfonation can be carried out, for instance, by dipping them into chlorosulfonic acid at −20° to 100°C, preferably at room temperature. The nitration can be carried out, for instance, by treating them in a mixture of concentrated sulfuric acid and concentrated nitric acid in a proportion of from 100:10 to 0:100 by weight at −10° to 100°C, preferably at 0°C to room temperature. The bromination can be carried out, for instance, by contacting them with bromine gas at 0° to 200°C, preferably at room temperature to 150°C. These chemical treatments should be carried out sufficiently to make the polymers infusible.

After being subjected to the chemical treatment, such as sulfonation, chlorosulfonation, nitration or bromination, the fiber or film of the polymers is heated under oxygen-intercepting conditions, e.g. in an atmosphere of nitrogen gas or in a vacuum with a gradual rise of the temperature from room temperature up to at least 400°C, if necessary, up to 3000°C to give the desired carbon fiber or filmy carbon.

The process of the present invention has advantages that an easily transformable polymer can be used as the starting material and the desired carbon product can be readily obtained by such simple processes as subjecting to conventional simple chemical treatment and then burning. The carbon fiber and filmy carbon obtained by the present process have excellent mechanical strength and are homogeneous and therefore, they are extremely useful for industrial use.

The present invention is illustrated by the following examples but is not limited thereto.

EXAMPLE 1

Amorphous polystyrene filaments having 50 μ in diameter (20 lines) were bundled to make a sliver having 10 cm in length. The sliver was hung inside of a separable flask having 5 cm in diameter and 20 cm in depth, in which the upper end of the sliver was fixed on the inside of the cap of said flask and the lower part was combined with a weight of stainless steel (10 g). After drying in vacuum at 60°C, a vapor of sulfuric anhydride was flowed into the flask at room temperature for 3 hours. After discharging the remaining sulfuric anhydride from the flask with nitrogen gas, it was dried in vacuum at room temperature and thereafter at 160°C. The thus chemically treated sliver of polystyrene filaments was put in a quartz boat and then heated in an electric ring furnace wherein air was replaced with nitrogen gas while raising the temperature at a rate of 50°C/hour up to 600°C and 200°C/hour from 600° up to 1000°C.

The tensile strength of the carbon fiber thus obtained was tested. It was measured 10 times by using an Instron fiber tensile tester. As the results, the average tensile strength was $1.13 \times 10^4$ kg/cm$^2$.

EXAMPLE 2

In the same manner as described in Example 1, polystyrene filaments having 12 μ in diameter were treated to give carbon fiber having a tensile strength of $1.31 \times 10^4$ kg/cm$^2$ and a modulus of elasticity of $1.1 \times 10^6$ kg/cm$^2$.

EXAMPLE 3

Amorphous polystyrene films having 4 μ in thickness, 5 mm in width and 3 cm in length (100 mg: about 20 films) were put in a test tube provided with a cock, and then dried in vacuum at 60°C. To the test tube was added chlorosulfonic acid (10 ml) in case of chlorosulfonation, a solution of mercury sulfate (5 mg) dissolved in fuming sulfuric acid (5 ml) in case of sulfonation, or a mixture of nitric acid (3 ml) and sulfuric acid (3 ml) in case of nitration, respectively, as shown in Table 1. Each was agitated at the temperature for the number of hours as shown in Table 1. Each polystyrene film thus reacted was separated by decantation, washed well with water and further with methanol, and then dried in vacuum at 60°C. The film thus obtained was put in a quartz boat and heated in an electric ring furnace wherein air was replaced with nitrogen gas while raising the temperature at a rate of 10°C/minute up to 1000°C. The filmy carbon thus obtained was subjected to elementary analysis. As the result, the content of carbon in the product was at least 85%. The carbonization yield was so high as shown in Table 1.

As a control, the films were treated in the same manner as described above excepting that they were not subjected to any chemical treatment. After burning, no carbon was residued.

Table I

| Kind of treatment | Chemical treatment Reagents | Conditions | Carbonization yield (%) |
|---|---|---|---|
| Chlorosulfonation | Chlorosulfonic acid (10 ml) | Room temp. 2 hours | 80.5 |
| Sulfonation | Mercury sulfate (5 mg) Fuming sulfuric acid (5 ml) | 0°C 7 hours | 27.7 |
| '' | '' | Room temp. 20 hours | 83.1 |
| '' | '' | 50°C 1 hour | 82.4 |
| Nitration | Nitric acid (3 ml) Sulfuric acid (3 ml) | Room temp. 2 hours | 51.6 |
| Control | Untreated | | 0 |

EXAMPLE 4

In the same manner as described in Example 3, crystalline polystyrene films having the same sizes as those of Example 3 were subjected to the reactions as shown in Table 2 to give filmy carbon. The results are shown in Table 2.

Table 2

| Kind of treatment | Chemical treatment Reagents | Conditions | Carbonization yield (%) |
|---|---|---|---|
| Chlorosulfonation | Chlorosulfonic acid (10 ml) | Room temp. 2 hours | 88.3 |
| Sulfonation | Mercury sulfate (30 mg) Conc. sulfuric acid (10 ml) | Room temp. 25 hours | 76.0 |
| Nitration | Nitric acid (1.8 ml) Sulfuric acid (7 ml) Water (1.2 ml) | Room temp. 3 hours | 45.3 |
| Control | Untreated | | 0 |

EXAMPLE 5

Amorphous polystyrene film having 95 mm in diameter and 50 μ in thickness was put on a Schale and then subjected to the chemical treatments in a 2 liter separable flask in the same manner as described in Example 1 and heated to give filmy carbon.

EXAMPLE 6

Polyacenaphthylene films having the same sizes as those in Example 3 (200 mg) were put in a test tube provided with a cock, and then dried in the same manner as described in Example 3. To the test tube was added the reagents as shown in Table 3 and subjected to nitration or sulfonation. The resultant product was further treated in the same manner as described in Example 3 in case of nitration, or in the same manner as described in Example 1 in case of sulfonation to give the chemically treated polyacenaphthylene films. The product was heated in the same manner as described in Example 3 to give the desired filmy carbon.

As a control, polyacenaphthylene film which was not subjected to any chemical treatment was heated under the same condition, and thereby only porous and bulky carbon was obtained.

Table 3

| Kind of treatment | Chemical treatment Reagents | Conditions | Yield of carbon (mg) |
| --- | --- | --- | --- |
| Nitration | Nitric acid (1.8 ml) Sulfuric acid (7 ml) Water (1.2 ml) | Room temp. 2 hours | 195 |
| Sulfonation | Sulfuric anhydride | Room temp. 3 hours | 188 |
| Control | | Untreated | 62 |

EXAMPLE 7

Polymers comprising long sequences of the unit of the formula as shown in Table 4 were each formed into film having the same sizes as those in Example 3. The films (each 100 mg) were chlorosulfonated with chlorosulfonic acid and further treated in the same manner as described in Example 3 to give the desired filmy carbon.

As the controls, the same films which were not subjected to any chemical treatment were heated as well, and thereby no carbon was obtained or only a slight amount of bulky carbon was obtained.

Table 4

| Unit formula of the polymer | Chemical treatment | Yield of carbon (mg) |
| --- | --- | --- |
| 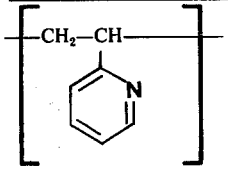 | Chlorosulfonation Untreated | 76.3 4.0 |
| 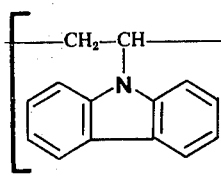 | Chlorosulfonation Untreated | 82.5 1.0 |
| 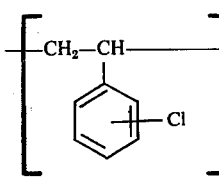 | Chlorosulfonation Untreated | 73.2 0 |

Table 4-continued

| Unit formula of the polymer | Chemical treatment | Yield of carbon (mg) |
| --- | --- | --- |
| 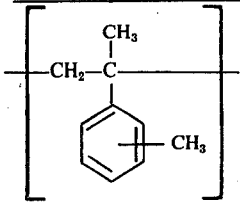 | Chlorosulfonation Untreated | 62.5 0 |

What is claimed is:

1. A process for producing carbon products which comprises (1) forming a polymer selected from the group consisting of polystyrene, polychlorostyrene, polydimethylstyrene, polychloromethylstyrene, polyvinylnaphthalene, polyvinylanthracene, polyvinylpyridine and poly-N-vinylcarbazole into a fiber having a diameter of 1 to 500 $\mu$ or a film having a thickness of 5 to 1000 $\mu$, (2) subjecting the fiber or film to sulfonation, chlorosulfonation, nitration or bromination sufficient to make the polymer infusible, and (3) carbonizing the resultant infusible product by heating to give carbon fibers or filmy carbon.

2. The process according to claim 1, wherein the polymer is subjected to sulfonation in step (2) by exposing the fiber or film of the polymer in a vapor of sulfur trioxide at 0° to 300°C.

3. The process according to claim 1, wherein the polymer is subjected to chlorosulfonation in step (2) by dipping the fiber or film of the polymer into chlorosulfonic acid at −20° to 100°C.

4. The process according to claim 1, wherein the polymer is subjected to nitration in step (2) by treating the fiber or film of the polymer in a mixture of concentrated sulfuric acid and concentrated nitric acid in a proportion of from 100 : 10 to 0 : 100 by weight at −10° to 100°C.

5. The process according to claim 1, wherein the polymer is subjected to bromination in step (2) by contacting the fiber or film of the polymer with bromine gas at 0° to 200°C.

6. The process according to claim 1, wherein the carbonization in step (3) is carried out by heating the chemically treated fiber or film of the polymer in the absence of oxygen while gradually raising the temperature from room temperature up to 3000°C.

7. The process according to claim 1, wherein the polymer is subjected to sulfonation in step (2) by dipping the fiber or film into fuming sulfuric acid at 0° to 200°C. in the presence of a sulfonation catalyst.

8. The process according to claim 7, wherein the sulfonation catalyst is mercury sulfate.

9. The process according to claim 1, wherein the fiber is a monofilament, sliver or tow.

10. The process according to claim 1, wherein the fiber is a monofilament having a diameter of 1 to 500 $\mu$.

* * * * *